Figure 1:
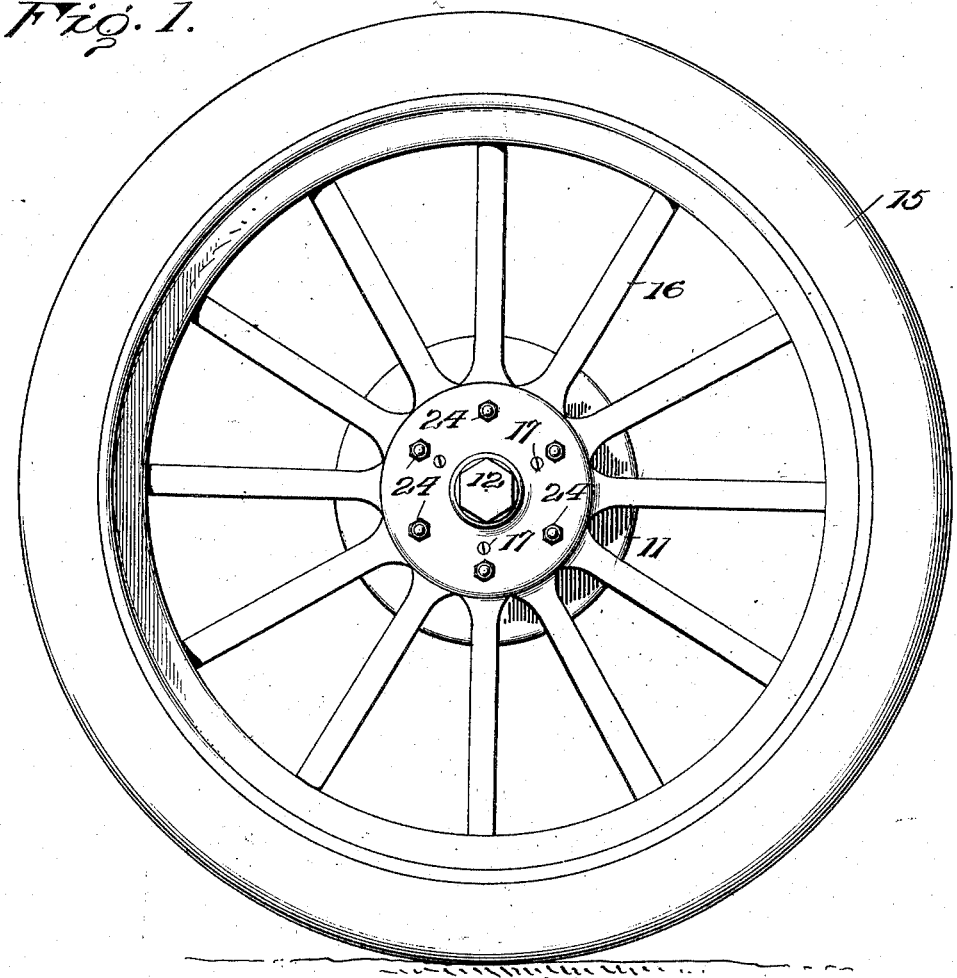

G. W. FARRELL AND E. R. NEWKIRK.
DEMOUNTABLE WHEEL.
APPLICATION FILED SEPT. 7, 1918.

1,325,838.

Patented Dec. 23, 1919.
2 SHEETS—SHEET 1.

Inventors
G. W. Farrell and
E. R. Newkirk.
By
Lacey & Lacey Attorneys

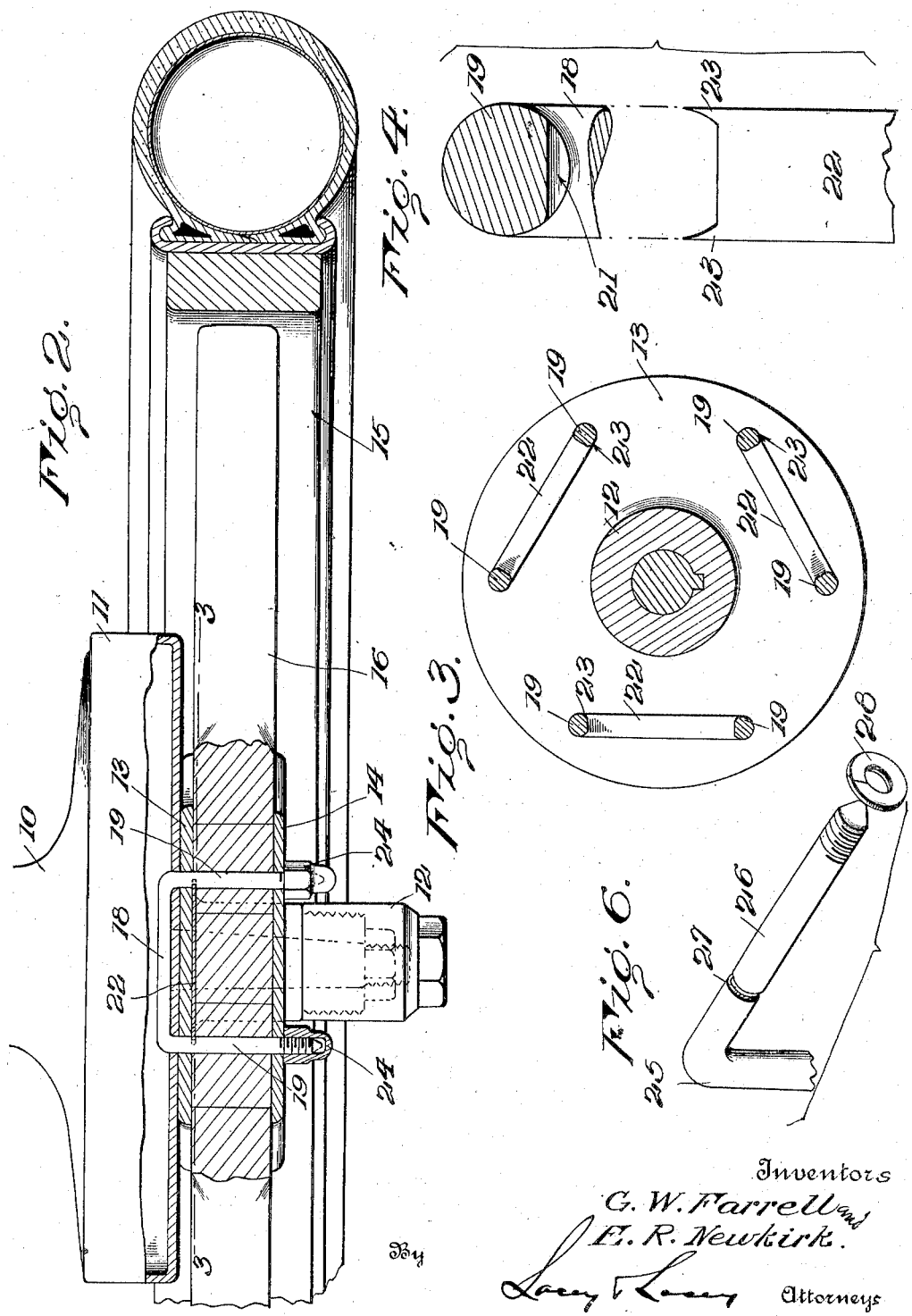

UNITED STATES PATENT OFFICE.

GEORGE W. FARRELL AND EARL R. NEWKIRK, OF GRAND RAPIDS, MICHIGAN.

DEMOUNTABLE WHEEL.

1,325,838.  Specification of Letters Patent.  Patented Dec. 23, 1919.

Application filed September 7, 1918. Serial No. 253,089.

*To all whom it may concern:*

Be it known that we, GEORGE W. FARRELL and EARL R. NEWKIRK, citizens of the United States, residing at Grand Rapids, in the county of Kent and State of Michigan, have invented certain new and useful Improvements in Demountable Wheels, of which the following is a specification.

This invention relates to an improved demountable wheel for motor vehicles and has as its primary object to provide a construction wherein the wheel may be readily and easily mounted upon or removed from any one of the wheel hubs of the vehicle.

The invention has as a further object to provide a construction particularly adapted for use upon vehicles of the Ford type and of such nature that but slight structural change will be required in the wheels of the vehicle in order that our present improvements may be used in connection therewith.

A still further object is to provide an arrangement wherein the demountable wheel will be rigidly secured in position when applied and wherein fastening means of such nature will be employed for the wheel that torsional strain upon the said fastening means will be eliminated.

And the invention has as a still further object to provide a construction wherein the fastening means for the demountable wheel will be locked upon the wheel hub so that during the operation of dismounting or replacing the wheel, said fastening means will not become displaced.

Figure 5:
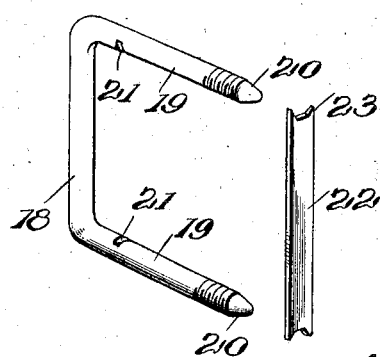

Other and incidental objects will appear during the course of the detailed description of the invention. In the drawings, wherein we have illustrated the preferred embodiment of the invention, and wherein similar reference characters designate corresponding parts throughout the several views:

Figure 1 is a front elevation showing the demountable wheel connected to a conventional type of vehicle axle, Fig. 2 is a fragmentary vertical sectional view more particularly illustrating the manner in which the wheel is connected to the wheel hub, Fig. 3 is a sectional view taken on the line 3—3 of Fig. 2 and looking inwardly, this view particularly showing the disposition of the locking plates for the fastening bolts of the wheel, Fig. 4 is a fragmentary sectional view showing the manner in which the fastening bolts are provided with grooves to receive the ends of the locking plates, Fig. 5 is a detail perspective view showing one of the fastening bolts and its locking plate detached, and Fig. 6 is a fragmentary perspective view showing a slightly modified form of locking means for the fastening bolts.

Referring now more particularly to the drawings, we have illustrated the present improvements in connection with the rear axle housing and one rear wheel of a motor vehicle of the Ford type, the present invention being, as previously intimated, particularly adapted for use in connection with this type of vehicle. However, as will appear as the description proceeds, the invention may be employed with equally good results in connection with various other types of vehicles and we do not wish to be limited in this regard. One end of the rear axle housing is indicated at 10 and, as is usual, receives the brake drum 11 thereover. The adjacent rear hub is illustrated at 12. This hub is formed with the usual inner hub plate 13 which is integral with the hub, and slidably fitted over the outer end of the hub is the outer hub plate 14. A rear wheel is shown at 15. This wheel is provided with spokes 16 which abut at their inner end portions to define a hub band slidably fitting over the hub and confined between the hub plates 13 and 14. As is well known, the plates 13 and 14 are respectively provided with six bolt openings, the openings of one plate registering with those of the other and receiving fastening devices therethrough connecting the plates and securing the wheel to the hub as well as securing the brake drum to the wheel.

In carrying the present invention into effect, the bolts normally securing the wheel to the wheel hub are removed and the outer hub plate 14 is, as particularly shown in Fig. 1 of the drawings, permanently connected to the hub band formed by the wheel spokes by a plurality of screws or other suitable fastening devices 17, the plate, of course, having its bolt openings registering with the bolt openings through the hub band of the spokes. Mounted upon the inner hub plate 13 is a plurality of U-bolts 18. One of these U-bolts is shown in Fig. 5 of the drawings, and, as there illustrated, it is provided with spaced parallel bolt shanks 19 the outer ends of which are preferably formed with tapered or conical terminals 20. Formed in the inner sides of the bolt shanks adjacent their inner ends are oppositely disposed grooves or notches 21. In connecting the bolts to the hub plate 13, the shanks 19 of said bolts are first inserted through the bolt openings in the brake drum 11, as illustrated in Fig. 2, and are then fitted through a pair of the bolt openings in the inner hub plate, the shanks of the several U-bolts eventually occupying, as is shown in Fig. 3, all of the bolt holes in the plate. As will be seen, the U-bolts will thus connect the brake drum with the inner hub plate and will project from said plate through the bolt openings in the hub band formed by the inner ends of the spokes of the wheel and through the bolt openings in the outer hub plate 14.

Detachably engaged with the U-bolts are locking members 22 therefor. These locking members are each in the nature of a flat resilient strip of metal notched out at its ends to provide, as particularly shown in Fig. 4 of the drawings, oppositely disposed lugs 23 at the side edges of the strip. After the U-bolts have been projected through the inner hub plate 13 and before the wheel is applied to the hub, the locking members 22 are sprung slightly so that they may be fitted between the shanks 19 of the U-bolts, and engaged at their ends in the notches 21 formed in said shanks. The locking members will thus be held against displacement longitudinally of the bolt shanks while the lugs 23 of said members will engage around the shanks, as shown in Fig. 3, to prevent lateral displacement of the members. These members will, therefore, serve to lock the U-bolts upon the inner hub plate 13 and, as particularly shown in Fig. 2, are disposed to lie flat against the inner side face of said plate. Thus, the locking members will also act to bind the connecting portions of the U-bolts against the inner face of the brake drum so that the bolts will at all times provide a firm connection between the brake drum and the inner hub plate. Removably threaded upon the outer ends of the U-bolts are nuts 24. Dome nuts are preferably employed and, as will be obvious, these nuts may be adjusted for tightly clamping the inner ends of the spokes between the hub plates 13 and 14 and firmly connecting the wheel with the wheel hub 12.

As will now be clear in view of the preceding description, the nuts 24 may be removed when the inner ends of the spokes may be withdrawn outwardly over the hub and the wheel removed therefrom. The wheel may thus be readily dismounted. On the other hand, by fitting the outer ends of the shanks of the U-bolts in the hub band formed by the inner ends of the spokes, the wheel may then be shifted inwardly over the hub to project the bolt shanks through the hub band of the spokes, when the nuts 24 may then be applied and adjusted for tightly clamping the wheel in position. Thus, the wheel may be readily replaced. In this connection, it is to be observed that since the shanks 19 of the U-bolts are formed with the pointed terminals 20, these terminals may be readily caused to enter the bolt openings in the hub band of the spokes and thus facilitate the operation of replacing the wheel. Furthermore, the particular function of the locking members 22 now becomes apparent. As will be seen, these locking members will coact with the inner hub plate 13 to prevent the inward displacement of the U-bolts, when the wheel is thus shifted inwardly over the hub, and will rigidly lock the U-bolts upon the plate so that the hub band of the wheel spokes may be readily forced over the bolt shanks.

Attention is now particularly directed to the fact that by employing the U-bolts 18, the bolt shanks 19 are held against rotation. Consequently, it becomes unnecessary to employ locking devices for holding the bolt shanks while, at the same time, the nuts 24 may be applied or removed at will without likelihood of turning of the shanks. Further, it is to be noted that owing to the tying effect produced between the shanks of the U-bolts, the tendency toward torsional strain which occurs in the use of single bolts when the nuts loosen slightly, is eliminated.

We, therefore, provide a particularly efficient construction for the purpose set forth and, at the same time, a construction which may be readily employed in connection with vehicles already in use.

In Fig. 6 of the drawings we have illustrated a slight modification in the locking means employed for the U-bolts. In this figure, a U-bolt is indicated at 25, this bolt corresponding to the U-bolts of the preferred construction. The bolt is provided with spaced parallel bolt shanks 26 in which are formed, adjacent the inner ends of said shanks, oppositely disposed surrounding notches or grooves 27. Adapted for removable engagement in the grooves 27 are locking members 28. These locking members are each in the nature of split resilient washers which may be sprung to engage within the grooves therefor. When thus in position these locking members will, as will be clear, serve the same functions as the locking members of the preferred construction.

Having thus described the invention, what is claimed as new is:

1. The combination with a wheel hub having a hub plate fixed thereon, of a demountable wheel carried by the hub and having a hub band surrounding the hub, spaced fastening means coacting with said plate and engaged with the hub band of the wheel, yielding means extending between said fastening means and standing between the band and plate for locking the fastening means against inward displacement, and means upon said fastening means for retaining the hub band against said plate and connecting the wheel with the hub.

2. The combination with a wheel hub having a hub plate fixed thereon, of a demountable wheel carried by the hub and having a hub band surrounding the hub, a U-bolt having spaced bolt shanks extending through said plate and through the hub band of the wheel, a spring locking member extending between the bolt shanks and engaged at its ends therewith at the inner side of the plate for locking the bolt against inward displacement through the plate, and means adjustable upon said bolt shanks for securing the hub band against said plate and connecting the wheel with the hub.

3. The combination with a wheel hub having a hub plate fixed thereon, of a demountable wheel carried by the hub and having a hub band surrounding the hub, a U-bolt having spaced bolt shanks extending through the plate and through the hub band of the wheel, said shanks being provided with notches, a locking strip extending between the bolt shanks and engaged at its ends in said notches to coact with the plate for locking the bolt against inward displacement through the plate, and means adjustable upon said bolt shanks for clamping the hub band against said plate and connecting the wheel with the hub.

4. The combination with a wheel hub having a hub plate fixed thereon, of a demountable wheel having a hub band surrounding the hub, a U-bolt having spaced bolt shanks extending through the plate and band and having notches, the portion of the bolt joining said shanks limiting the bolt shanks against outward displacement through the plate, a resilient member engaging the notch of each shank next outside the plate and limiting its inward displacement therethrough, and means upon said bolt shanks for bearing the hub band toward said plate and connecting the wheel with the hub.

5. The combination with a wheel hub having a hub plate fixed thereon, of a demountable wheel carried by the hub and having a hub band surrounding the hub, spaced fastening means extending through the plate and through the hub band of the wheel, a locking strip extending between said fastening means and engaged at its ends therewith, the strip coacting with the plate for limiting the fastening means against inward displacement therethrough, means carried by the strip and coacting with said fastening means for holding the strip against lateral displacement with respect thereto, and means upon said fastening means securing the hub band thereon.

6. The combination with a plate having perforations, and an element having holes adapted to register with the perforations, of a U-bolt whose shanks are spaced to pass through said registering apertures and notched in their adjacent sides, nuts on said shanks, and a spring strip having its ends engaged with said notches and its body held between the plate and element by setting up said nuts.

7. The combination with a plate having perforations, and an element having holes adapted to register with the perforations, of a U-bolt whose shanks are spaced to pass through said registering apertures, nuts on the shanks, and a spring strip held between the plate and element by setting up said nuts, each of its ends abutting a shank and having lugs at its edges passing partly astride the same.

In testimony whereof we affix our signatures.

GEORGE W. FARRELL. [L. S.]
EARL R. NEWKIRK. [L. S.]